US008385433B2

(12) United States Patent
Wang et al.

(10) Patent No.: US 8,385,433 B2
(45) Date of Patent: Feb. 26, 2013

(54) LINEAR PRECODING FOR SPATIALLY CORRELATED CHANNELS

(75) Inventors: Jibing Wang, San Diego, CA (US); Gwendolyn D. Barriac, San Diego, CA (US); Hemanth Sampath, San Diego, CA (US); Tamer Kadous, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 693 days.

(21) Appl. No.: 11/552,941

(22) Filed: Oct. 25, 2006

(65) Prior Publication Data

US 2007/0174038 A1 Jul. 26, 2007

Related U.S. Application Data

(60) Provisional application No. 60/731,029, filed on Oct. 27, 2005.

(51) Int. Cl.
*H04L 27/00* (2006.01)

(52) U.S. Cl. ...................................................... 375/259

(58) Field of Classification Search .................. 375/259, 375/260, 316, 346
See application file for complete search history.

(56) References Cited

U.S. PATENT DOCUMENTS

| 6,631,347 | B1 | 10/2003 | Kim |
| 6,675,174 | B1 | 1/2004 | Bolle |
| 6,766,144 | B2 * | 7/2004 | Kim et al. .................. 455/67.11 |
| 7,330,701 | B2 * | 2/2008 | Mukkavilli et al. ............. 455/69 |
| 2003/0043929 | A1 | 3/2003 | Sampath |
| 2004/0185792 | A1 | 9/2004 | Alexiou |
| 2005/0128983 | A1 * | 6/2005 | Kim et al. ..................... 370/334 |
| 2006/0093065 | A1 * | 5/2006 | Thomas et al. ............... 375/299 |

FOREIGN PATENT DOCUMENTS

| CN | 1317891 A | 10/2001 |
| EP | 0342687 | 11/1989 |
| EP | 1146660 | 10/2001 |
| EP | 1311126 | 5/2003 |
| EP | 1536586 | 6/2005 |
| JP | 2001352280 A | 12/2001 |
| JP | 2001352283 | 12/2001 |
| JP | 2004029708 A | 1/2004 |
| JP | 2006522505 T | 9/2006 |
| JP | 2007517455 | 6/2007 |
| RU | 2250563 | 4/2005 |
| WO | WO02091591 A1 | 11/2002 |
| WO | WO2005071864 | 8/2005 |
| WO | WO2005078957 A1 | 8/2005 |

OTHER PUBLICATIONS

Zhou et al.; "Optimal Transmitter Eigen-Beamforming and Space-Time Block Coding Based on Channel Mean Feedback;" IEEE Transactions on Signal Processing; Oct. 2002; pp. 1-15; vol. 50, No. 10; IEEE Service Center; New York, NY.
International Searching Authority; International Search Report PCT/US2006/041949; Oct. 27, 2006.
Written Opinion—PCT/US2006/041949, International Search Authority, European Patent Office, Oct. 27, 2006.

* cited by examiner

*Primary Examiner* — Kevin M Burd
(74) *Attorney, Agent, or Firm* — Howard H. Seo

(57) ABSTRACT

Systems and methodologies are described that facilitate estimating transmit covariance from evaluation of a channel (e.g., forward link channel, reverse link channel, . . . ) to be utilized in linear precoding for multiple-input multiple-output (MIMO) wireless communication systems. Predefined codebooks that include any number of precoding matrices may be modified based upon transmit covariance estimations to yield improved precoding performance. Further, channel related feedback may be generated and analyzed by utilizing the modified codebooks.

32 Claims, 11 Drawing Sheets

LINEAR PRECODING FOR SPATIALLY CORRELATED CHANNELS

CROSS-REFERENCE TO RELATED APPLICATIONS

This application claims the benefit of U.S. Provisional Patent application Ser. No. 60/731,029 entitled "A METHOD AND APPARATUS FOR LINEAR PRE-CODING FOR SPATIALLY CORRELATED CHANNELS" which was filed Oct. 27, 2005. The entirety of the aforementioned application is herein incorporated by reference.

BACKGROUND

I. Field

The following description relates generally to wireless communications, and more particularly to linear precoding based upon considerations of covariance in a wireless communication system.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ... ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region. However, conventional techniques may provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection facilitating estimation of transmit covariance from evaluation of a channel (e.g., forward link channel, reverse link channel, ... ) to be utilized in linear precoding for multiple-input multiple-output (MIMO) wireless communication systems. Predefined codebooks that include any number of precoding matrices may be modified based upon transmit covariance estimations to yield improved precoding performance. Further, channel related feedback may be generated and analyzed by utilizing the modified codebooks.

According to related aspects, a method that facilitates generating feedback for linear precoding tailored based upon covariance is described herein. The method may comprise determining covariance from observation of a forward link channel. Further, the method may include modifying a predefined codebook based upon the covariance. Moreover, the method may comprise generating feedback related to the forward link channel by utilizing the modified codebook.

Another aspect relates to a wireless communications apparatus. The wireless communications apparatus may include a memory that retains a preset codebook and instructions related to estimating covariance associated with a forward link channel, altering matrices in the preset codebook based upon the covariance, and generating feedback by leveraging the altered matrices. Further, the communications apparatus may comprise a processor, coupled to the memory, configured to execute the instructions retained in the memory.

Yet another aspect relates to a wireless communications apparatus that generates feedback for linear precoding by utilizing transmit covariance. The wireless communications apparatus may include means for estimating transmit covariance from a forward link channel; means for altering a predefined codebook based upon the transmit covariance; and means for generating feedback based upon an estimate of the forward link channel and the altered codebook.

Still another aspect relates to a machine-readable medium having stored thereon machine-executable instructions for estimating statistical information from a forward link channel, estimating a matrix related to the forward link channel, and modifying a predefined codebook that includes a plurality of matrices based upon the statistical information. The machine-readable medium may further have stored thereon machine executable instructions for identifying a particular one of the plurality of matrices as a function of the estimated matrix and transmitting data related to the particular one of the plurality of matrices over a reverse link channel.

In accordance with another aspect, an apparatus in a wireless communication system may include a processor, wherein the processor may be configured to determine a covariance pertaining to a forward link channel. Further, the processor may be configured to adjust precoding matrices included in a predefined codebook based upon the covariance. Moreover, the processor may be configured to yield precoding feedback based upon the adjusted precoding matrices.

According to a further aspect, a method that facilitates controlling forward link transmission based upon linear precoding that utilizes a measure of transmit covariance is described herein. The method may comprise determining covariance from an analysis of a reverse link channel. Additionally, the method may include altering a predefined codebook based upon the covariance. Further, the method may include analyzing received feedback based upon the altered codebook. Moreover, the method may comprise controlling transmission over a forward link channel by applying the analyzed feedback.

Another aspect relates to a wireless communications apparatus. The wireless communications apparatus may include a memory that retains a codebook and instructions for determining transmit covariance, modifying a preset codebook, and evaluating feedback based upon the modified codebook. Further, the wireless communications apparatus may include a processor, coupled to the memory, configured to execute the instructions retained in the memory.

Still another aspect relates to a wireless communications apparatus that controls forward link transmission by employing linear precoding with transmit covariance estimation. The wireless communications apparatus may include means for identifying transmit covariance based upon analysis of a reverse link channel, means for adjusting a predefined codebook as a function of the covariance, means for evaluating feedback by utilizing the adjusted codebook, and means for controlling forward link transmission based upon the evaluated feedback.

Yet another aspect relates to a machine-readable medium having stored thereon machine-executable instructions for estimating a transmit covariance matrix from an evaluation of a reverse link channel; modifying original precoding matrices in a predefined codebook based upon the transmit covariance matrix; and controlling communications over a forward link channel based upon an evaluation of received feedback by employing the modified precoding matrices.

In accordance with another aspect, an apparatus in a wireless communication system may include a processor, wherein the processor be configured to evaluate a correlation associated with a reverse link channel, alter a codebook based upon the correlation, receive feedback related to a forward link channel, and evaluate the feedback based upon the altered codebook.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
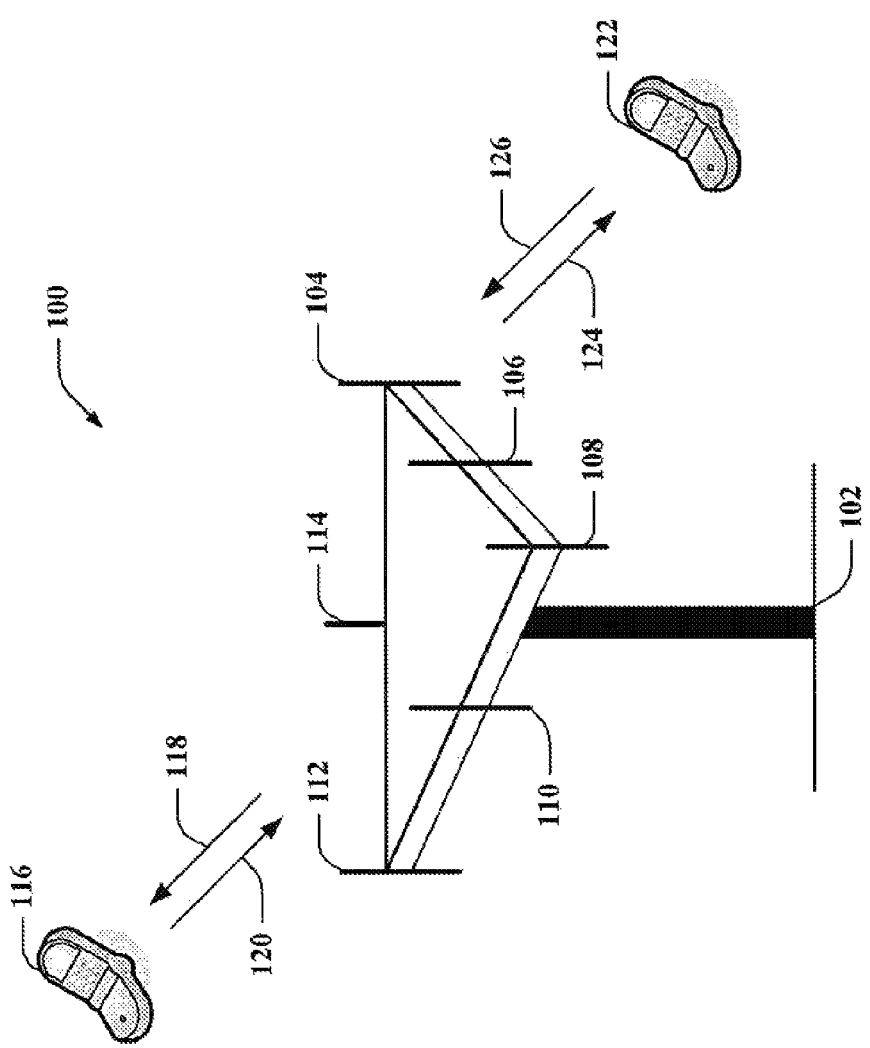
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component" "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that may include multiple antenna groups. For example, one antenna group may include antennas 104 and 106, another group may comprise antennas 108 and 110, and an additional group may include antennas 112 and 114. Two antennas are illustrated for each antenna group; however, more or fewer antennas may be utilized for each group. Base station 102 may additional include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 may communicate with one or more mobile devices such as mobile device 116 and mobile device 122; however, it is to be appreciated that base station 102 may communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency band than that used by reverse link 120, and forward link 124 may employ a different frequency band that used by reverse link 120, and forward link 124 may employ a different frequency band than that employed by reverse link 126, for example. Further, in a time division duplex (TDD) system, forward link 118 and reverse link 120 may utilize a common frequency band and forward link 124 and reverse link 126 may utilize a common frequency band.

Each group of antennas and/or the area in which they are designated to communicate may be referred to as a sector of base station 102. For example, antenna groups may be designed to communicate to mobile devices in a sector of the areas covered by base station 102. In communication over forward links 118 and 124, the transmitting antennas of base station 102 may utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells may be subject to less interference as compared to a base station transmitting through a single antenna to all its mobile devices.

According to an example, system 100 may be a multiple-input multiple-output (MIMO) communication system. Further, system 100 may utilize any type of duplexing technique to divide communication channels (e.g., forward link, reverse link, . . . ) such as FDD, TDD, and the like. Moreover, system 100 may employ linear precoding that leverages covariance feedback; for example, a transmit covariance matrix (and/or a transmit correlation matrix) may be estimated and employed in connection with linear precoding. Pursuant to an illustration, base station 102 may transmit over forward links 118 and 124 to mobile devices 116 and 122. Mobile devices 116 and 122 may evaluate transmit covariance (e.g., correlation) associated with respective forward links 118 and 124. Mobile devices 116 and 122 may each be associated with a predetermined codebook (e.g., including N matrices, where N may be any integer), each of which may be modified based upon the estimated covariance associated with the respective forward links 118 and 124. Additionally, mobile devices 116 and 122 may estimate the forward link channels. The modified codebooks may be employed to determine feedback to be provided to base station 102 related to the estimated channels. For example, mobile devices 116 and 122 may utilize vector and/or scaler quantization to generate the feedback. According to an illustration, an index associated with an updated matrix from the modified codebook may be transmitted from one of the mobile devices 116 and 122 to base station 102; however, the claimed subject matter is no so limited. The feedback may be transmitted over a reverse link channel to base station 102.

Base station 102 may obtain channel related feedback from mobile devices 116 and 122. Further, base station 102 may analyze covariance (e.g., transmit covariance, correlation, . . . ) from each of the reverse links 120 and 126, and thereafter the covariance may be utilized to alter a predefined codebook retained by base station 120 (e.g., in a substantially similar manner as altered by mobile devices 116 and 122). According to an example, base station 102 and mobile device 116 may utilize a substantially similar predefined codebook, and the codebook may be modified in a substantially similar manner (e.g., based upon covariance that may be estimated by both base station 102 and mobile device 116) to enable providing a common understanding of feedback provided from mobile device 116 to base station 102; likewise, base station 102 and mobile device 122 may employ and modify a substantially similar codebook in a substantially similar manner. The altered codebook may be employed to evaluate the obtained channel related feedback. Additionally, base station 102 may control subsequent transmission over the forward link channel based upon the analyzed feedback (e.g., by performing beamforming to obtain beamforming gain).

Figure 2:
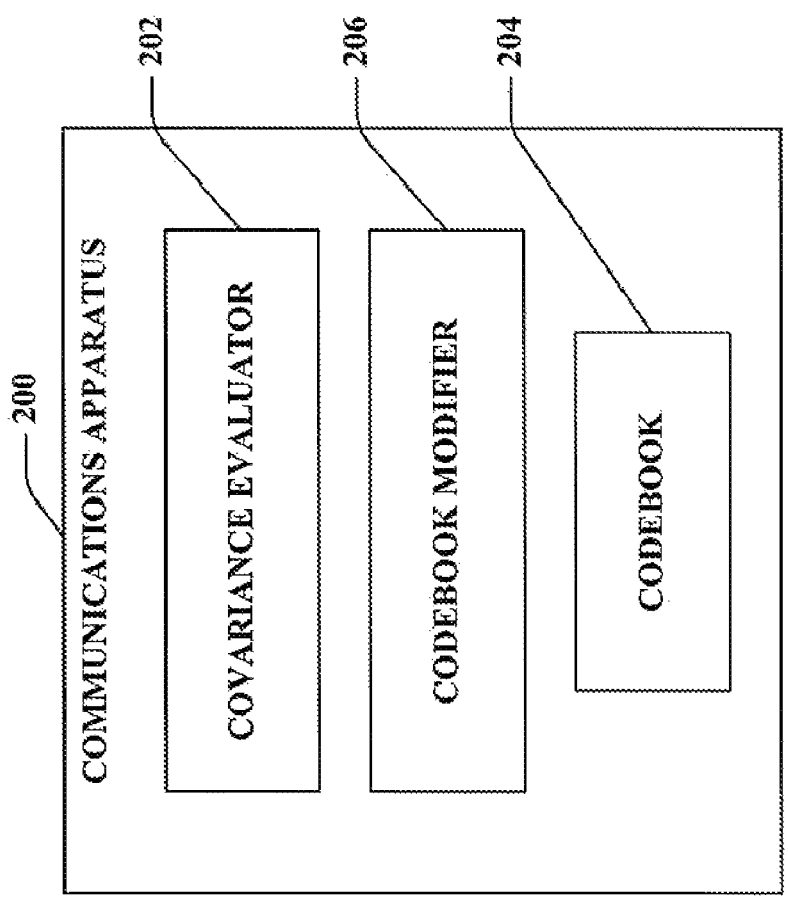
FIG. 2 is an illustration of an example communications apparatus for employment within a wireless communications environment.

Turning to FIG. 2, illustrated is a communications apparatus 200 for employment within a wireless communications environment. Communications apparatus 200 may be a base station or a portion thereof or a mobile device or a portion thereof. Communications apparatus 200 may include a covariance evaluator 202 that estimates covariance associated with transmit antennas. According to an illustration, communications apparatus 200 may be utilized in a FDD MIMO system where a forward link and a reverse link lack reciprocity (e.g., based at least in part due to utilizing disparate frequency bands for forward and reverse link channels); however, the forward link and the reverse link may have statistical reciprocity since multiple transmit antennas may be correlated. Similarly, multiple transmit antennas may be correlated in a TDD MIMO system. Since the forward link and the reverse link may have statistical reciprocity, even though the channels may differ, covariance (and/or correlation) may be estimated from both a forward link channel (e.g., at a mobile device) and from a reverse link channel (e.g., at a base station). Thus, a similar covariance matrix R (and/or correlation matrix) may be available and/or estimated (e.g., generated) at both the base station and the mobile device. For example, transmit antenna correlation may be due to geometry and/or location (e.g., limited space) associated with antennas and/or the relatively narrow angle at which data may be received.

Communications apparatus 200 may further include a codebook 204 (e.g., predefined codebook) and a codebook modifier 206. Codebook 204 may include a set of N original matrices (where N may be any integer) (e.g., a set of N original unitary matrices). For example, codebook 204 may be designed for identically independently distributed (iid) channels. Further, codebook 204 may be $C=\{F_j\}_{j=1}^N$, where $F_j$ may be a $M_T \times L$ unitary matrix, $M_T$ may be number of transmit antennas, and L may be a rank and/or number of spactial multiplexing streams. According to an example, codebook 204 may include 64 original matrices; however, the claimed subject matter is not limited to this example and rather contemplate utilization of any number of original matrices. Pursuant to a further example, a substantially similar codebook with substantially similar matrices may be utilized with a disparate communications apparatus with which communications apparatus 200 interacts. Codebook 204 may be retained in memory (not shown) associated with communications apparatus 200, generated by communications apparatus 200, obtained by communications apparatus 200 from a disparate source, and the like.

Moreover, codebook modifier 206 may alter matrices included in the predefined codebook 204 based upon the covariance estimate yielded by covariance evaluator 202. Assuming that a transmit covariance matrix R is known at both a transmitter and receiver, codebook modifier 206 may modify codebook 204 to enable combining linear precoding with covariance feedback. Thus, codebook modifier 206 may modify the original precoding matrices in codebook 204 as a function of the covariance structure. In particular, a new codebook with updated matrices may be yielded by codebook modifier 206. Moreover, matrices in the modified codebook may be utilized for identifying a channel. The modified codebook yielded by codebook modifier 206 may provide improved performance for yielding feedback as compared to conventional techniques that fail to utilize considerations of covariance.

According to an example, codebook modifier 206 may modify codebook 204 as follows (e.g., upon covariance evaluator 202 observing a strong correlation at the transmitter antennas) to yield a new codebook $C_1$:

$$C_1 = \{\text{eigen\_vector}(R^{1/2} F_j F_j^H R^{H/2})\}_{j=1}^N$$

Pursuant to this illustration, $R^{1/2}$ may be the square root of the matrix R (e.g., $R=R^{1/2}R^{H/2}$). Additionally, $F_j$ may be the j-th original matrix (e.g., unitary matrix) from codebook 204 and $F_j^H$ may be the conjugate transpose of the j-th original matrix from codebook 204. Further, N may be the number of matrices included in the codebook; for instance, N may be any integer.

In accordance with another example, codebook modifier 206 may alter codebook 204 as follows:

$$C_2 = \{\text{proper\_normalization of}(R^{1/2} F_j)\}_{j=1}^N$$

According to another example, vector or scalar quantization may be utilized to quantize a subspace spanned by dominant eigen-vectors of R (e.g., determined by covariance evaluator 202). For example, the basis may be randomized and/or a smaller number of bits may be used for weaker eigen-modes (basis). Additionally or alternatively, for rector quantization, the dominant subspace may be quantized. Pursuant to another illustration, for scalar quantization, dominant eigenbeams of the channel may be projected onto the basis of the subspace spanned by dominant eigen-vectors of R.

According to an example, communications apparatus 200 may be a mobile device that evaluates a forward link channel to yield a channel matrix H. Further, eigen decomposition may be effectuated upon the channel matrix by analyzing $H^H H = U^H \Lambda U$, where U may be a channel unitary matrix corresponding to the channel matrix H, $H^H$ may be the conjugate transpose of H, $U^H$ may be the conjugate transpose of U, and $\Lambda$ may be a diagonal matrix. Pursuant to an example, the mobile device may feedback information associated with U, which may be quantized (e.g., utilizing scalar and/or vector quantization).

In accordance with an example employing scalar quantization, eigen decomposition may additionally be effectuated upon the transmit covariance matrix R to yield $R = U_R^H \Lambda U_R$, where $U_R$ may be a covariance unitary matrix. At the mobile device, $U = (U_1 U_2)$ and $U_R = (U_{R1} U_{R2})$. $U_1$ may be projected into the $U_R$ matrix, and the projection may be fed back via the reverse link channel. For example, $U_1 = U_1^H U_{R1} U_{R1} + U_1^H U_{R2} U_{R2}$ may be evaluated by the mobile device, and $U_1^H U_{R1}$ and $U_1^H U_{R2}$ may be provided as feedback since $U_{R1}$ and $U_{R2}$ may be estimated at the base station to which the feedback is transferred. According to another example, R may be a 4×4 matrix (e.g., there are 4 transmit antennas); thus, $\Lambda$ may include $\Lambda_1, \Lambda_2, \Lambda_3$ and $\Lambda_4$. For instance, $\Lambda_3$ and $\Lambda_4$ may be small if there is strong correlation between the corresponding transmit antennas. Pursuant to an example where there is a strong correlation, some eigenvalues may be significantly smaller than the dominant eignvalues—thus, quantization may utilize a subset of the basis (e.g., 2 out of 4 basis) to project onto the dominant eigenvectors (e.g., to save feedback and provide improved performance). Additionally, for instance, $\Lambda_1$ and $\Lambda_2$ may be dominant and thus $U_{R1}$ and $U_{R2}$ may be utilized as the projection basis; however, if $\Lambda_1$ and $\Lambda_2$ are substantially similar to each other, then $U_{R1}$ and $U_{R2}$ may not be employed as the basis. Rather, a new basis may be determined based upon $U = (U_{R1} U_{R2}) \Omega_j$, where $\Omega_j$ may be a randomized unitary matrix known at both the base station and the mobile device, and where j may be from 1 to N (which may be any integer).

Moreover, although not shown, it is to be appreciated that communications apparatus 200 may include memory that retains instructions with respect to determining covariance (e.g., transmit covariance, correlation, ...) from observation of a channel, altering matrices in a predefined codebook based upon the covariance, generating feedback by employing the altered matrices, analyzing received feedback by utilizing the altered matrices, controlling transmission over a channel based upon the feedback, and the like. Further, communications apparatus 200 may include a processor that may be utilized in connection with executing instructions (e.g., instructions retained within memory, instructions obtained from a disparate source, ...).

Figure 3:
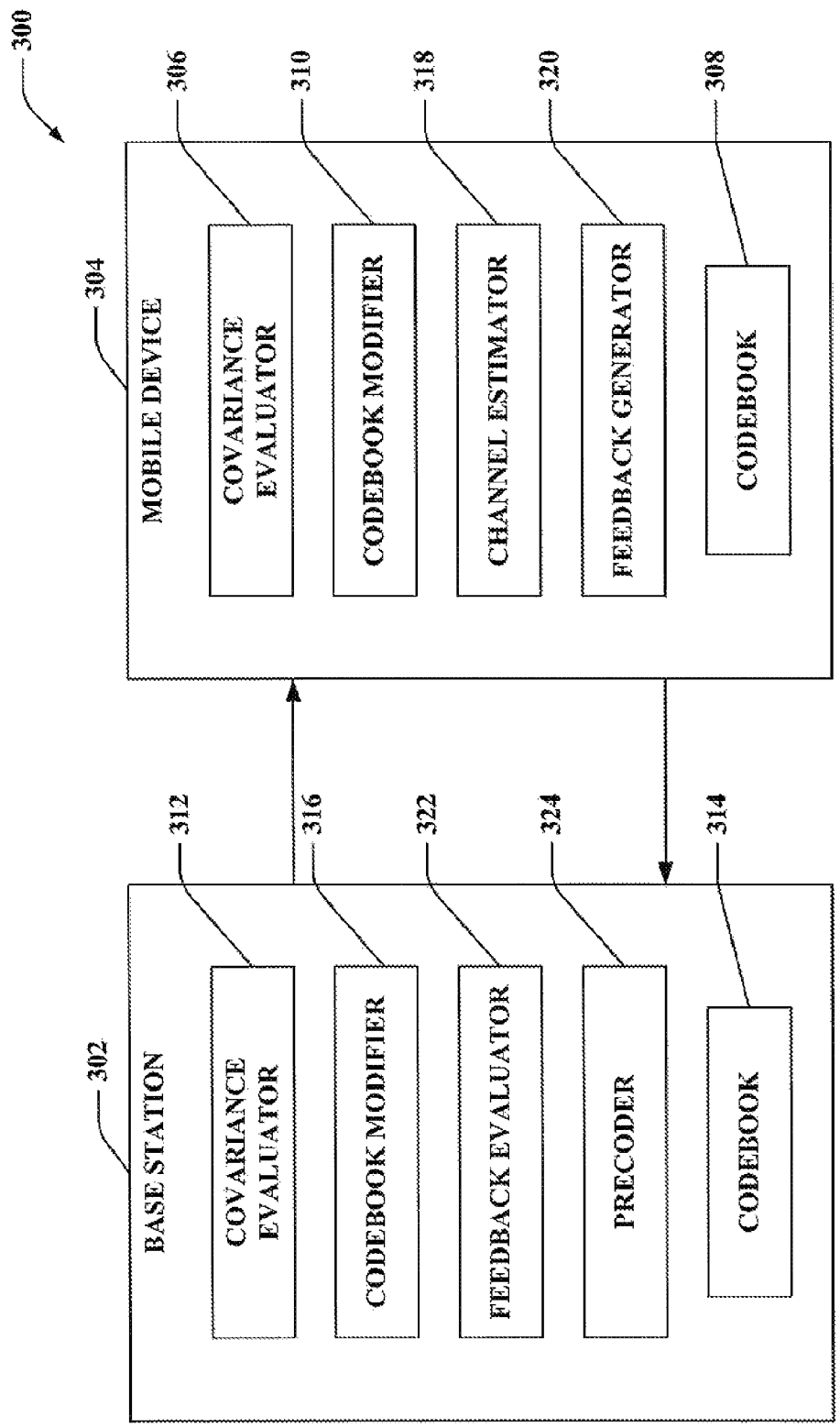
FIG. 3 is an illustration of an example wireless communications system that effectuates linear precoding based upon considerations of covariance feedback.

Now referring to FIG. 3, illustrated is a wireless communications system 300 that effectuates linear precoding based upon considerations of covariance feedback. System 300 includes a base station 302 that communicates with a mobile device 304 (and/or any number of disparate mobile devices (not shown)). Base station 302 may transmit information to mobile device 304 over a forward link channel; further base station 302 may receive information from mobile device 304 over a reverse link channel. Moreover, system 300 may be a MIMO system.

Mobile device 304 may include a covariance evaluator 306, a codebook 308, and a codebook modifier 310. Codebook 308 may be a predefined codebook that includes any number of matrices (e.g., unitary matrices). Mobile device 304 may obtain information transferred over a forward link channel. Covariance evaluator 306 may determine covariance associated with the forward link channel and/or generate a transmit covariance matrix R. Further, codebook modifier 310 may alter codebook 308 based upon the determined covariance.

Base station 302 may likewise include a covariance evaluator 312, a codebook 314, and a codebook modifier 316, which may be substantially similar to covariance evaluator 306, codebook 308, and codebook modifier 310, respectively. Thus, base station 302 and mobile device 304 may employ substantially similar predefined codebooks 308 and 314. Further, covariance evaluators 306 and 312 enable both base station 302 and mobile device 304 to estimate covariance associated with the reverse link channel and the forward link channel, respectively (e.g., which may be substantially similar due to statistically reciprocity within MIMO systems). Moreover, codebook modifiers 310 and 316 facilitate adjusting matrices within codebooks 308 and 314 in a common manner based upon the similar covariance estimates.

Mobile device 304 may further include a channel estimator 318 and a feedback generator 320. Channel estimator 318 may estimate the forward link channel from base station 302 to mobile device 304. Channel estimator 318 may generate a matrix H that corresponds to the forward link channel, where columns of H may relate to transmit antennas of base station 302 and rows of H may pertain to receive antennas at mobile device 304. According to an example, base station 302 may utilize four transmit antennas and mobile device 304 may employ two receive antennas, and thus, channel estimator 318 may evaluate the forward link channel to yield a two-by-four channel matrix H (e.g., where $$H = \begin{bmatrix} h_{11} & h_{12} & h_{13} & h_{14} \\ h_{21} & h_{22} & h_{23} & h_{24} \end{bmatrix});$$

however, it is to be appreciated that the claimed subject matter contemplates utilizing any size (e.g., any number of rows and/or columns) channel matrix H (e.g., corresponding to any number of receive and/or transmit antennas).

Feedback generator 320 may employ the channel estimate (e.g., channel matrix H) to yield feedback that may be transferred to base station 302 over the reverse link channel. According to an example, feedback generator 320 (and/or channel estimator 318) may effectuate eigen decomposition of the channel matrix H to yield a corresponding channel unitary matrix U. For instance, the channel unitary matrix U may include information related to direction of the channel determined from the estimated channel matrix H. Eigen decomposition of the channel matrix H may be effectuated based upon $H^H H = U^H \Lambda U$, where U may be a channel unitary matrix corresponding to the channel matrix H, $H^H$ may be the conjugate transpose of H, $U^H$ may be the conjugate transpose of U, and $\Lambda$ may be a diagonal matrix.

Moreover, feedback generator 320 may compare (or quantize) the channel unitary matrix U to the set of altered matrices (e.g., unitary matrices) from the modified codebook generated by codebook modifier 310 (e.g., to quantize the channel unitary matrix U). Further, a selection may be made from the set of altered unitary matrices. An index associated with the selected unitary matrix from the set may be identified by feedback generator 320. Moreover, feedback generator 320 may provide the index to base station 302 via the reverse link channel.

Base station 302 may further include a feedback evaluator 322 and a precoder 324. Feedback evaluator 322 may analyze the feedback (e.g., the obtained index associated with the quantized information) received from mobile device 304. For example, feedback evaluator 322 may utilize the modified codebook of unitary matrices generated by codebook modifier 316 to identify the selected unitary matrix based upon the received index; thus, the unitary matrix identified by feedback evaluator 322 may be substantially similar to the unitary matrix selected by feedback generator 320.

Further, precoder 324 may be utilized by base station 302 to alter subsequent transmissions over the forward link channel based upon the matrix identified by feedback evaluator 322 from the altered codebook. For example, precoder 324 may perform beamforming for forward link communications based upon the feedback. According to a further example, precoder 324 may multiply the identified matrix by a transmit vector associated with the transmit antennas of base station 302.

Figure 4:
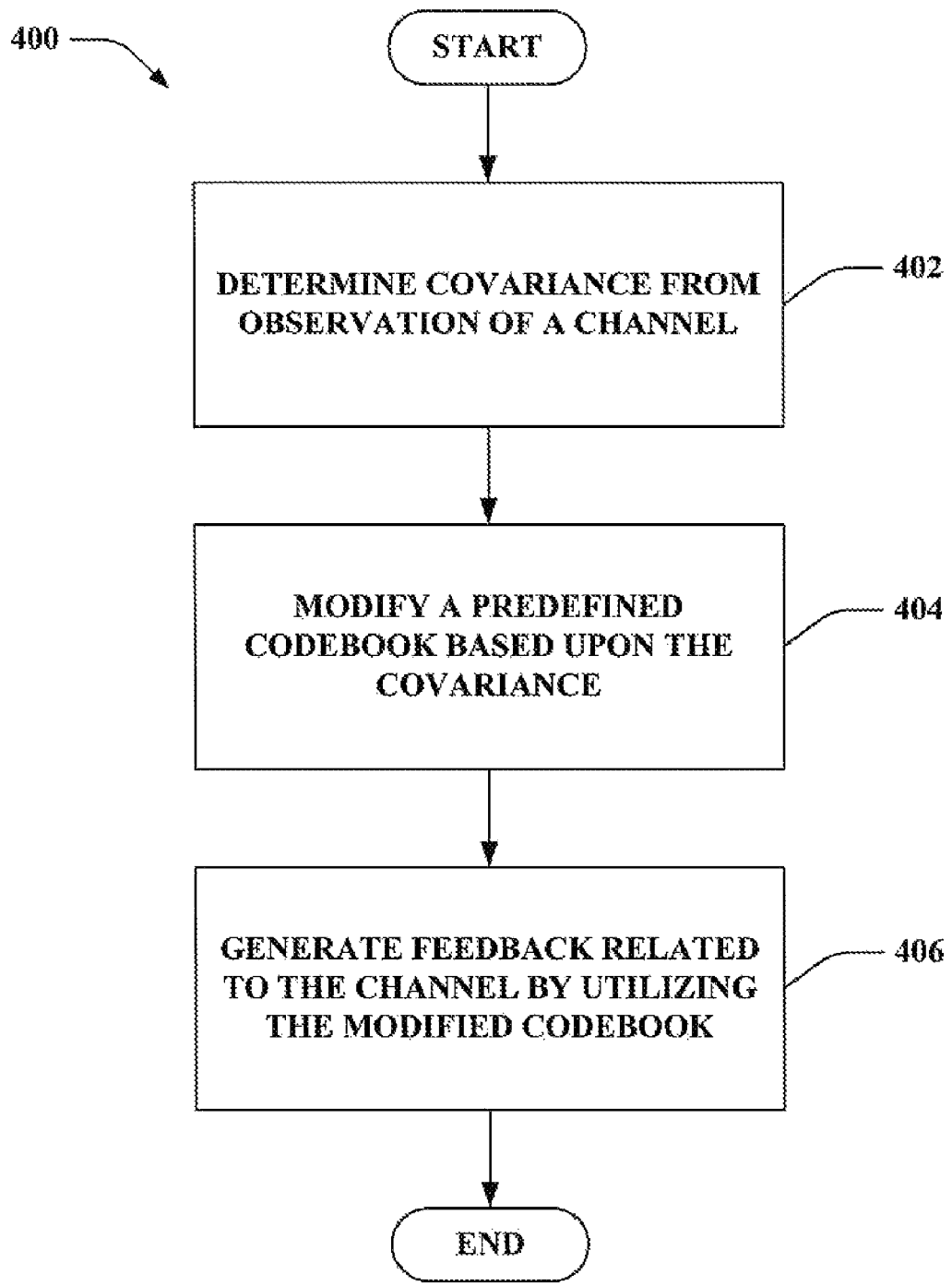
FIG. 4 is an illustration of an example methodology that facilitates generating feedback for linear precoding that may be tailored based upon covariance.
Figure 5:
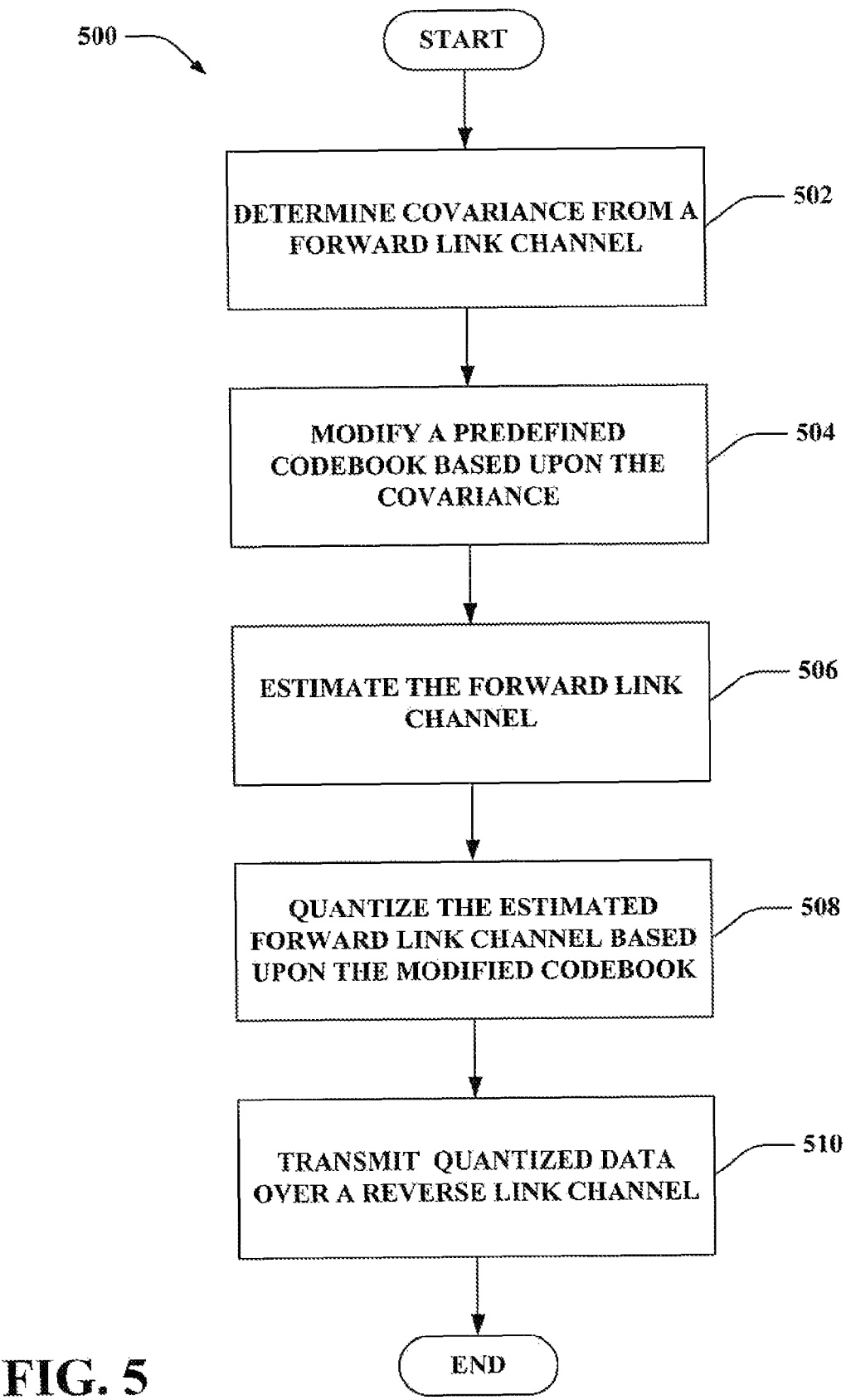
FIG. 5 is an illustration of an example methodology that facilitates quantizing data associated with a channel for providing feedback in connection with linear precoding.
Figure 6:
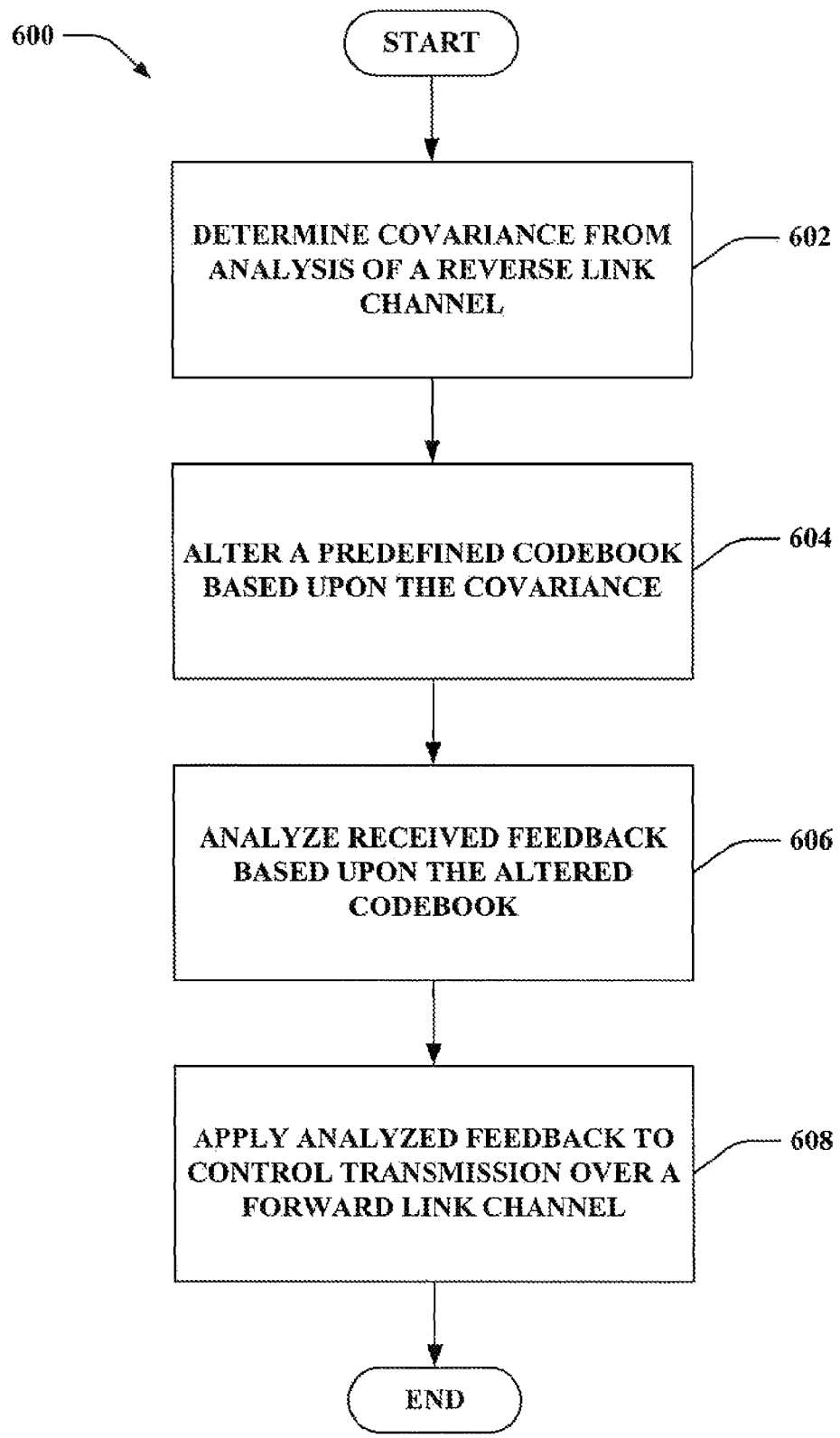
FIG. 6 is an illustration of an example methodology that facilitates controlling forward link transmission based upon linear precoding that utilizes a measure of transmit covariance.

Referring to FIGS. 4-6, methodologies relating to combining linear precoding with covariance feedback in MIMO systems are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 4, illustrated is a methodology 400 that facilitates generating feedback for linear precoding that may be tailored based upon covariance. At 402, covariance may be determined from observation of a channel (e.g., forward link channel). Pursuant to an illustration, the covariance (e.g., transmit covariance, correlation, . . . ) may be determined from the forward link channel as well as from a reverse link channel (e.g., in a MIMO environment). Accordingly, the covariance estimated from the forward link channel may be substantially similar to the covariance estimated from the reverse link channel. At 404, a predefined codebook may be modified based upon the covariance. It is contemplated that adjusted precoding matrices that form the modified codebook may be yielded. For example, the covariance may be utilized to modify the predefined codebook in a manner agreed upon with a disparate communications apparatus (e.g., base station). At 406, feedback related to the channel may be generated by utilizing the modified codebook. In accordance with an example, the forward link channel may be estimated and a channel matrix may be generated. A particular altered matrix from the modified codebook may be selected based upon the channel matrix (and/or as a function of a channel related unitary matrix obtained by effectuating eigen decomposition). Further, an index associated with the selected matrix may be identified and sent as feedback over the reverse link channel; however, it is to be appreciated that the claimed subject matter is not so limited to such example.

Now referring to FIG. 5, illustrated is a methodology 500 that facilitates quantizing data associated with a channel for providing feedback in connection with linear precoding. At 502, covariance may be determined from a forward link channel (e.g., in a MIMO system). At 504, a predefined codebook may be modified based upon the covariance. At 506, the forward link channel may be estimated. According to an example, any type of duplexing may be utilized in connection with the forward link channel and a reverse link channel; thus, the channels need not be reciprocal (e.g., the forward link channel need not be able to be estimated from an analysis of the reverse link channel). However, covariance may be obtained by way of evaluating the forward and reverse link channels. At 508, the estimated forward link channel may be quantized based upon the modified codebook. For example, scalar and/or vector quantization may be employed. At 510, quantized data may be transmitted over a reverse link channel.

With reference to FIG. 6, illustrated is a methodology 600 that facilitates controlling forward link transmission based upon linear precoding that utilizes a measure of transmit covariance. At 602, covariance may be determined from an analysis of a reverse link channel. The estimate of the covariance may be substantially similar to an estimate yielded by a disparate communications apparatus (e.g., mobile device) from which feedback may be obtained. At 604, a predefined codebook may be altered based upon the covariance. At 606, received feedback may be analyzed based upon the altered codebook. For instance, an index may be obtained, and a matrix from the altered codebook that corresponds to the index may be identified. At 608, the analyzed feedback (e.g., identified matrix) may be applied to control transmission over a forward link channel. According to an example, beamforming may be effectuated by utilizing the analyzed feedback (e.g., identified matrix).

It will be appreciated that, in accordance with one or more aspects described herein, inferences can be made regarding analyzing covariance, modifying predefined codebooks, providing channel related feedback, utilizing channel related feedback, etc. As used herein, the term to "infer" or "inference" refers generally to the process of reasoning about or inferring states of the system, environment, and/or from a set of observations as captured via events and/or data. Interference can be employed to identify a specific context or action, or can generate a probability distribution over states, for example. The inference can be probablistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting a manner by which to apply estimated transmit covariance (e.g., selecting modifications effectuated upon matrices in a predetermined codebook based upon the obtained estimate of the transmit covariance). By way of further illustration, an inference may be made related to selecting whether to utilize the covariance estimate in connection with linear precoding. It will be appreciated that the foregoing examples are illustrative in nature and are not intended to limit the number of references that can be made or the manner in which such inferences are made in conjunction with the various embodiments and/or methods described herein.

Figure 7:
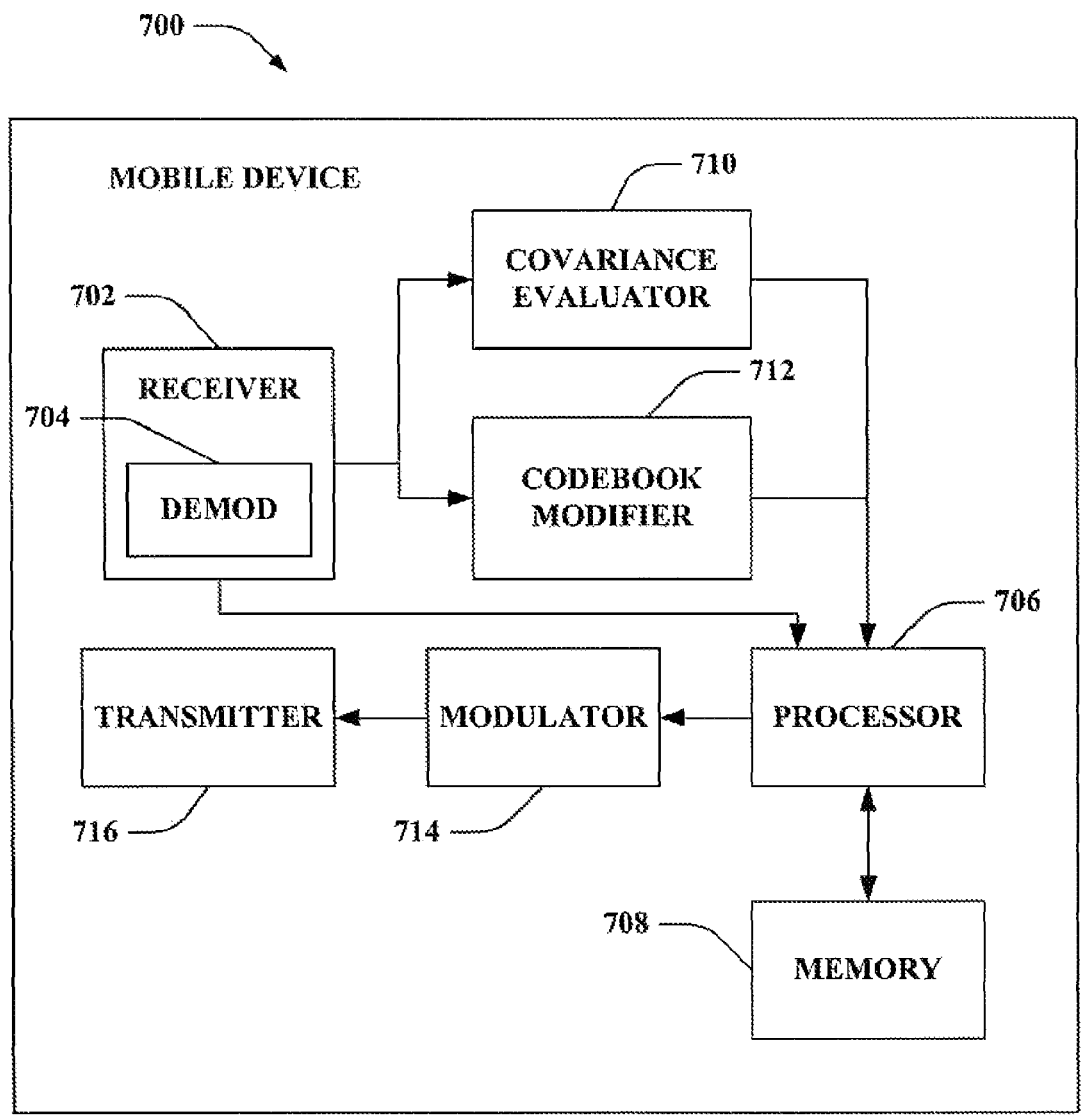
FIG. 7 is an illustration of an example mobile device that facilitates estimating transmit covariance and/or utilizing the transmit covariance with linear precoding in a MIMO system.

FIG. 7 is an illustration of a mobile device 700 that facilitates estimating transmit covariance and/or utilizing the transmit covariance with linear precoding in a MIMO system. Mobile device 700 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that may store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRAM). The memory 708 of the subject systems and methods is intended to comprise, without being limited to, these and any other suitable types of memory.

Receiver 702 is further operatively coupled to a covariance evaluator 710 that evaluates transmit covariance (e.g., correlation) from the forward link channel at mobile device 700. The transmit covariance obtained by covariance evaluator 710 may be substantially similar to a transmit covariance obtained from analyzing the reverse link channel—thus, the covariance may be known by both a receiver and a transmitter (e.g., mobile device 700 and a base station). Additionally, a codebook modifier 712 may utilize the transmit covariance to alter a preset codebook retained in memory 708 of mobile device 700. For example, the preset codebook may include N matrices, where N may be any integer. Codebook modifier 712 may adjust the N matrices as a function of the transmit covariance obtained by covariance evaluator 710. The modified codebook yielded by codebook modifier 712 may thereafter be employed (e.g., by processor 706) to generate feedback that may be sent over a reverse link channel. For example, one or more matrices from the modified codebook may be selected that correspond to an estimation of a forward link channel, and data associated with the selected one or more matrices may be transferred (e.g., to a base station). Mobile device 700 still further comprises a modulator 714 and a transmitter 716 that transmits the signal to, for instance, a base station, another mobile device, etc. Although depicted as being separate from the processor 706, it is to be appreciated that covariance evaluator 710, codebook modifier 712 and/or modulator 714 may be part of processor 706 or a number of processors (not shown).

Figure 8:
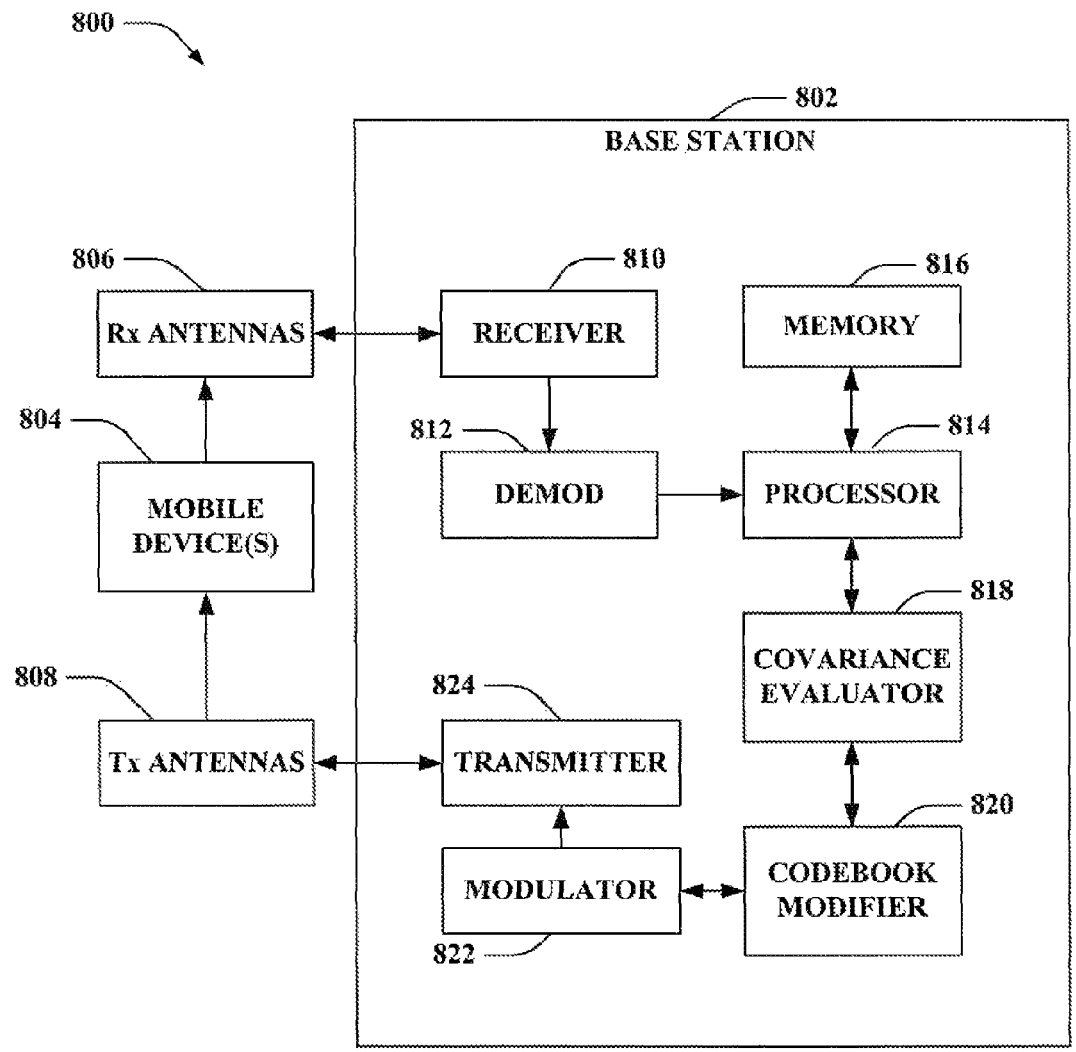
FIG. 8 is an illustration of an example system that facilitates receiving and/or utilizing feedback to control forward link transmission based upon considerations of transmit covariance in a MIMO environment.

FIG. 8 is an illustration of a system 800 that facilitates receiving and/or utilizing feedback to control forward link transmission based upon considerations of transmit covariance in a MIMO environment. System 800 comprises a base station 802 (e.g., access point, . . . ) with a receiver 810 that receives signal(s) from one or more mobile devices 804 through a plurality of receive antennas 806, and a transmitter 822 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a covariance evaluator 818 that analyzes transmit covariance associated with reverse link channel(s). For example, covariance evaluator 818 may evaluate transmit covariance related to any number of reverse links. Further, the transmit covariance associated with each reverse link may be substantially similar to a transmit covariance related to a corresponding forward link (e.g., due to statistical reciprocity).

Covariance evaluator 818 may be further coupled to a codebook modifier 820 that alters a predefined codebook based upon covariance related data obtained by covariance evaluator 818. For example, the predefined codebook may include N precoding matrices, where N may be any integer. Further, the predefined codebook may be retained in memory 816 of base station 802. Codebook modifier 820 may adjust the predefined codebook to provide for improved linear precoding performance. The adjusted codebook may be utilized to analyze received channel related feedback. For example, processor 814 may identify a particular matrix from the adjusted codebook that corresponds to the obtained feedback. Further, processor 814 may effectuate transmitting over the forward link channel as a function of the identified matrix (e.g., beamforming). Information utilized to control subsequent transmissions may be provided to a modulator 822. Modulator 822 can multiplex the control information for transmission by a transmitter 826 through antenna 808 to mobile device(s) 804. Although depicted as being separate from the processor 814, it is to be appreciated that implicit feedback evaluator 818, explicit feedback evaluator 820 and/or modulator 822 may be part of processor 814 or a number of processors (not shown).

Figure 9:
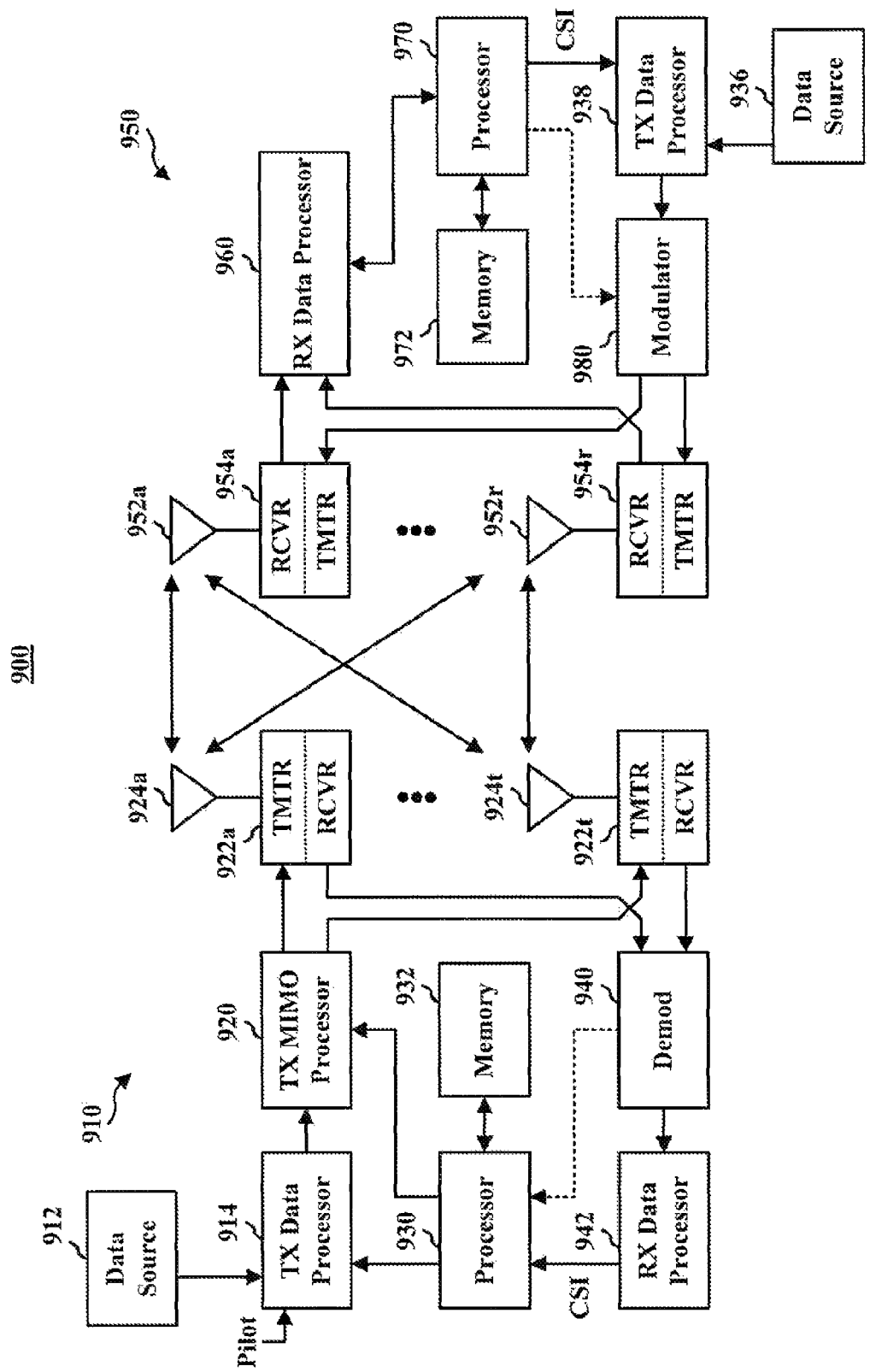
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 may include more than one base station and/or more than one mobile device, wherein additional base stations and/or mobile devices may be substantially similar or different from example base station 910 and mobile device 950 described below. In addition, it is to be appreciated that base station 910 and/or mobile device 950 may employ the systems (FIGS. 1-3 and 7-8) and/or methods (FIGS. 4-6) described herein to facilitate wireless communication there between.

At base station 910, traffic data for a number of data streams is provided from a data source 912 to a transmit (TX) data processor 914. According to an example, each data stream may be transmitted over a respective antenna. TX data processor 914 formats, codes, and interleaves the traffic data stream based on a particular coding scheme selected for that data stream to provide coded data.

The coded data for each data stream may be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and may be used at mobile device 950 to estimate channel response. The multiplexed pilot and coded data for each data stream may be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream may be determined by instructions performed or provided by processor 930.

The modulation symbols for the data streams may be provided to a TX MIMO processor 920, which may further process the modulation symbols (e.g., for OFDM), TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples and further processes the samples to provide a corresponding "received" symbol stream.

An RX data processor 960 may receive and process the $N_R$ received symbol streams from $N_R$ receivers 954 based on a particular receiver processing technique to provide $N_T$ "detected" symbol streams. RX data processor 960 may demodulate, deinterleave, and decode each detected symbol stream to recover the traffic data for the data stream. The processing by RX data processor 960 is complementary to that performed by TX MIMO processor 920 and TX data processor 914 at a base station 910.

A processor 970 may periodically determine which precoding matrix to utilize as discussed above. Further, processor 970 may formulate a reverse link message comprising a matrix index portion and a rank value portion.

The reverse link message may comprise various types of information regarding the communication link and/or the received data stream. The reverse link message may be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 may process the extracted message to determine which precoding matrix to use for determining the beamforming weights.

Processors 930 and 970 may direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 10:
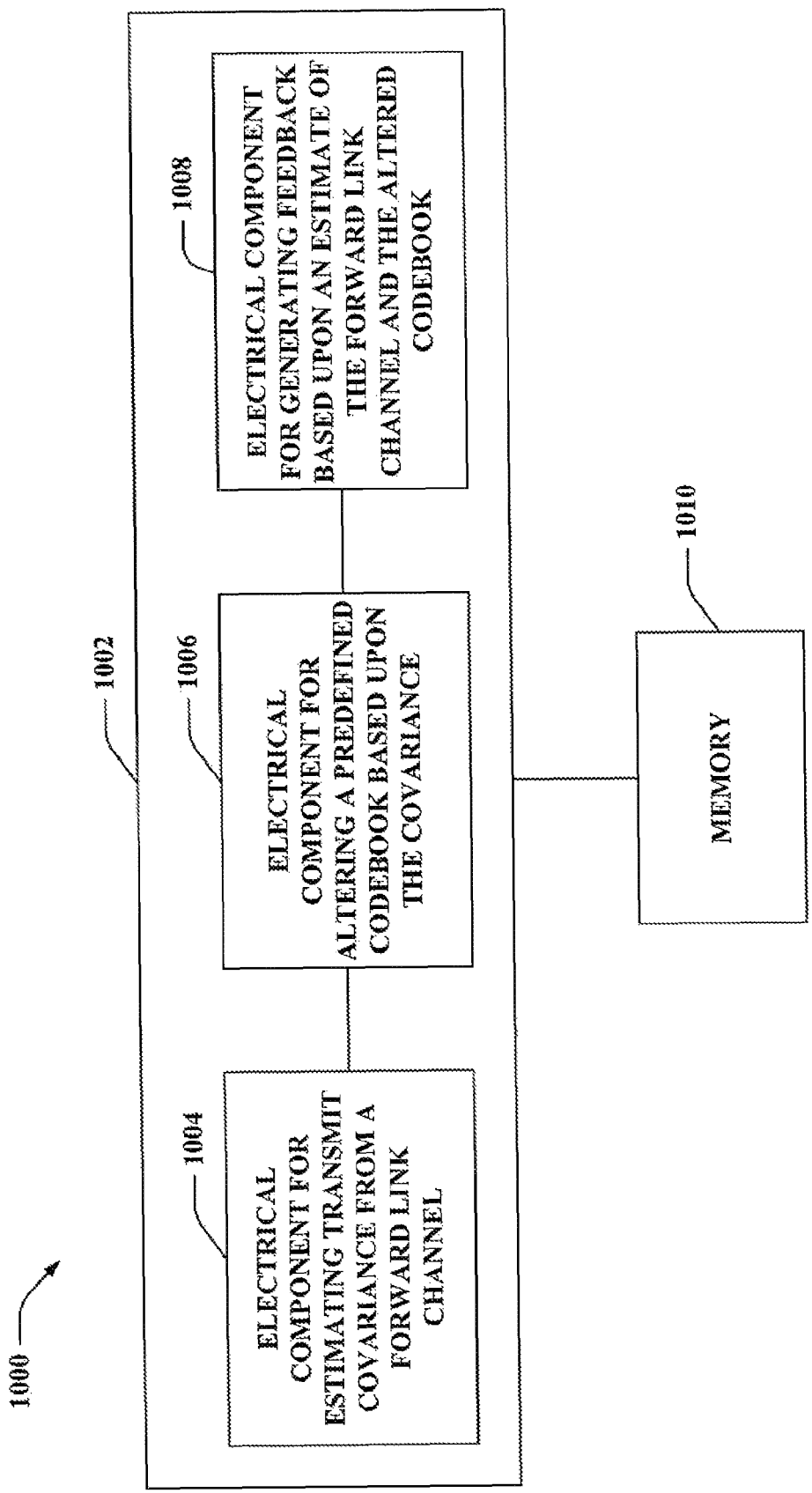
FIG. 10 is an illustration of an example system that provides feedback for linear precoding by utilizing transmit covariance estimate(s).

With reference to FIG. 10, illustrated is a system 1000 that provides feedback for linear precoding by utilizing transmit covariance estimate(s). For example, system 100 may reside at least partially within a mobile device. It is to be appreciated that system 1000 is represented as including functional blocks, which may be functional blocks that represent functions implemented by processor, software, or combination thereof (e.g., firmware). System 1000 includes a logical grouping 1002 of electrical components that can act in conjunction. For instance, logical grouping 1002 may include an electrical component for estimating transmit covariance from a forward link channel 1004. For example, a substantially similar transmit covariance may be estimated from the forward link channel as compared to a transmit covariance estimated from a reverse link channel. Further, the forward link channel and the reverse link channel may be associated with a MIMO environment. Further, logical grouping 1002 may comprise an electrical component for altering a predefined codebook based upon the covariance 1006. For example, matrices included in the predefined codebook may be modified as a function of the estimated covariance. Moreover, logical grouping 1002 may include an electrical component for generating feedback based upon an estimate of the forward link channel and the altered codebook 1008. According to an example, an estimated channel matrix may be obtained from analyzing the forward link channel, and the estimated channel matrix may be compared (or quantized) to matrices in the altered codebook. Further, an index associated with a selected matrix from the altered codebook may be identified and/or transferred (e.g., to a base station). Additionally, system 1000 may include a memory 1010 that retains instructions for executing functions associated with electrical components 1004, 1006, and 1008. While shown as being external to memory 1010, it is to be understood that one or more of electrical components 1004, 1006, and 1008 may exist within memory 1010.

Figure 11:
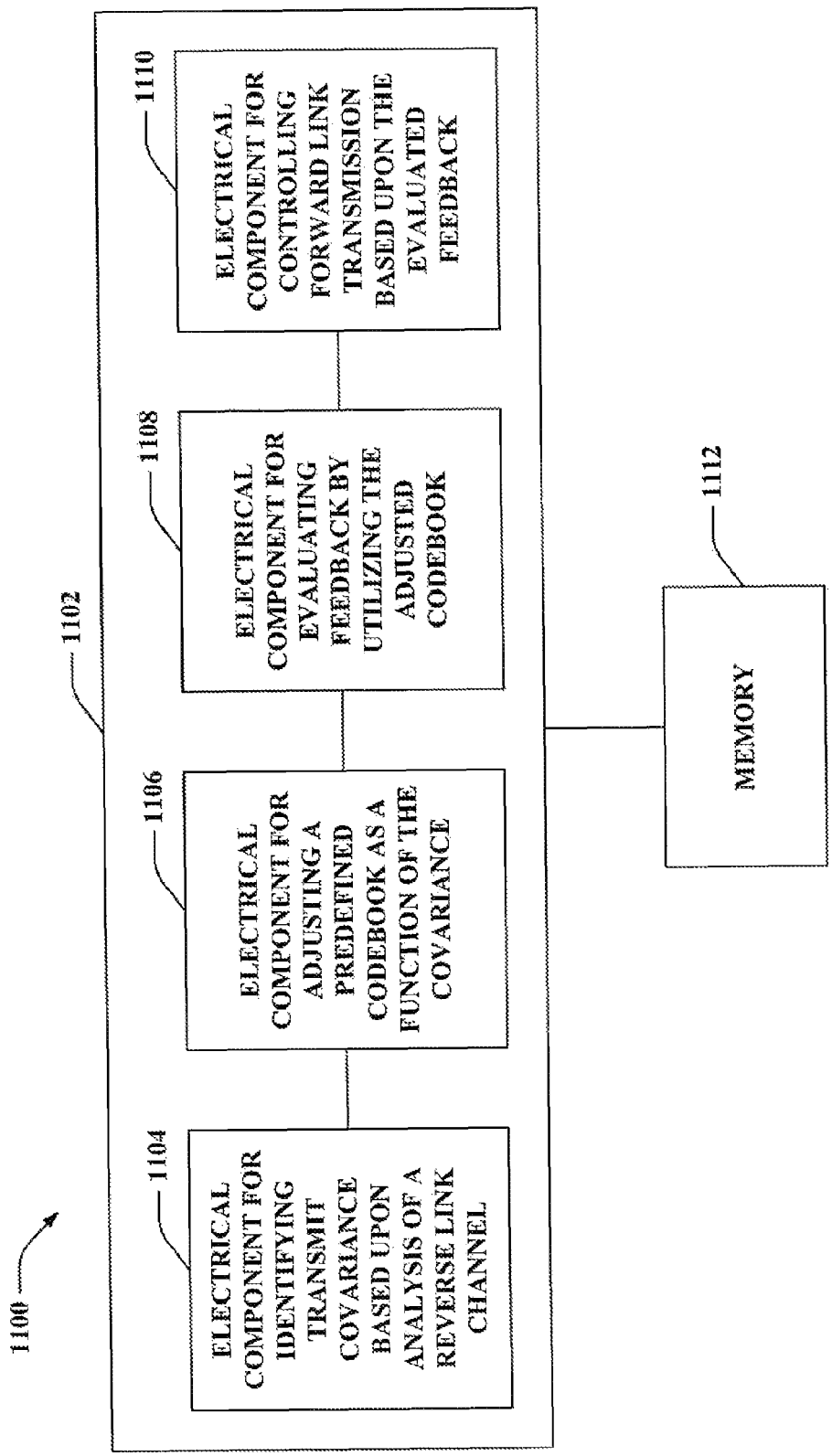
FIG. 11 is an illustration of an example system that controls forward link transmission by employing linear precoding with transmit covariance estimation.

Turning to FIG. 11, illustrated is a system 1100 that controls forward link transmission by employing linear precoding with transmit covariance estimation. System 1100 may reside within a base station, for instance. As depicted, system 1100 includes functional blocks that may represent functions implemented by a processor, software, or combination thereof (e.g., firmware). System 1100 includes a logical grouping 1102 of electrical components that facilitate controlling forward link transmission. Logical grouping 1102 may include an electrical component for identifying transmit covariance based upon analysis of a reverse link channel 1104. For example, the reverse link channel may be statistically similar to a forward link channel even though the channels may lack reciprocity (e.g., for a FDD system); however, the claimed subject matter is not limited to non-reciprocal channels (e.g., thus, system 1100 may be a TDD system). Moreover, logical grouping 1102 may include an electrical component for adjusting a predefined codebook as a function of the covariance 1106. According to an example, a receiver and a transmitter may adjust the predefined codebook in a substantially similar manner. Further, logical grouping 1102 may comprise an electrical component for evaluating feedback by utilizing the adjusted codebook 108. Also, logical grouping 1102 may include an electrical component for controlling forward link transmission based upon the evaluated feedback 1110. For example, beamforming may be effectuated by leveraging the evaluated feedback. Additionally, system 1100 may include a memory 1112 that retains instructions for executing functions associated with electrical components 1104, 1106, 1108, and 1110. While shown as being external to memory 1112, it is to be understood that electrical components 1104, 1106, 1108, and 1110 may exist within memory 1112.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed:

1. A method for generating feedback for linear precoding based upon a transmit covariance, the method being performed by a communications apparatus, the method comprising:
   determining the transmit covariance from observation of a forward link channel;
   estimating the forward link channel to yield a channel estimate;
   using a codebook modifier for modifying a predefined codebook based upon the transmit covariance, wherein a disparate communications apparatus maintains a codebook that is substantially similar to the predefined codebook, wherein modifications made to the disparate communications apparatus' codebook are substantially similar to modifications made to the predefined codebook by the communications apparatus, and wherein the predefined codebook comprises at least one matrix having a dimension that is a rank of the forward link channel, wherein the modifying comprises determining a product of a square root of a transmit covariance matrix and an original matrix from the predefined codebook;
   quantizing the channel estimate by selecting a precoding matrix from the modified predefined codebook; and
   generating feedback related to the forward link channel by utilizing the modified codebook, wherein the feedback is used for linear precoding.

2. The method of claim 1, further comprising:
   identifying an index associated with the selected precoding matrix; and
   transmitting the index over a reverse link channel.

3. The method of claim 2, further comprising:
   estimating the forward link channel to yield a channel matrix; and
   determining a channel unitary matrix corresponding to the channel matrix by effectuating eigen decomposition upon the channel matrix; and quantizing the channel unitary matrix.

4. The method of claim 1, wherein modifying the predefined codebook further comprises generating an altered codebook $C_1$ by evaluating $C_1 = \{\text{eigen\_vector}(R^{1/2} F_j F_j^H R^{H/2})\}_{j=1}^N$, where R is a transmit covariance matrix, $R^{1/2}$ is the square root of the matrix R, $F_j$ is a j-th original matrix from the predefined codebook, $F_j^H$ is the conjugate transpose of the j-th original matrix from predefined codebook, and N is a number of matrices included in the altered codebook.

5. The method of claim 1, wherein modifying the predefined codebook further comprises building a modified codebook $C_2 = \{\text{proper\_normalization of}(R^{1/2} F_j)\}_{j=1}^N$, where R is a transmit covariance matrix, $R^{1/2}$ is the square root of the matrix R, $F_j$ is a j-th original matrix from the predefined codebook, and N is a number of matrices included in the modified codebook.

6. The method of claim 1, wherein the transmit covariance is at least one of a transmit covariance matrix and a correlation.

7. The method of claim 1, wherein the forward link channel is associated with a multiple-input multiple-output (MIMO) system.

8. The method of claim 1, wherein the transmit covariance determined from observation of the forward link channel is substantially similar to an estimation of a covariance from a reverse link channel.

9. The method of claim 1, wherein the predefined codebook includes N unitary matrices, where N may be an integer.

10. The method of claim 1, further comprising quantizing a subspace spanned by one or more dominant eigen vectors of a transmit covariance matrix.

11. A wireless communications apparatus, comprising:
    a memory that retains a preset codebook and instructions related to estimating a transmit covariance associated with a forward link channel, altering matrices in the preset codebook based upon the transmit covariance, and generating feedback by leveraging the altered matrices, wherein the feedback is used for linear precoding, wherein at least one matrix of the matrices in the preset codebook comprises a dimension that is a rank of the forward link channel, wherein the altering comprises determining a product of a square root of a transmit covariance matrix and an original matrix from the preset codebook; and
    a processor, coupled to the memory, configured to execute the instructions retained in the memory;
    wherein a disparate communications apparatus maintains a codebook that is substantially similar to the preset codebook, wherein alterations to matrices in the codebook of the disparate communications apparatus' codebook are substantially similar to alterations to matrices in the preset codebook made by the communications apparatus.

12. The wireless communications apparatus of claim 11, wherein the memory further retains instructions for estimating the forward link channel, selecting a particular matrix from the altered matrices, and determining an index associated with the particular matrix.

13. The wireless communications apparatus of claim 11, wherein the memory further retains instructions for quantizing a subspace spanned by dominant eigen-vectors of a transmit covariance matrix.

14. A wireless communications apparatus that generates feedback for linear precoding by utilizing transmit covariance, comprising:
    means for estimating transmit covariance from a forward link channel;
    means for altering a predefined codebook based upon the transmit covariance, wherein a disparate communications apparatus maintains a codebook that is substantially similar to the predefined codebook, wherein alterations made to the disparate communications apparatus' codebook are substantially similar to alterations made to the predefined codebook by the communications apparatus, and wherein the predefined codebook comprises at least one matrix having a dimension that is a rank of the forward link channel, wherein the altering comprises determining a product of a square root of a transmit covariance matrix and an original matrix from the predefined codebook; and
    means for generating feedback based upon an estimate of the forward link channel and the altered codebook, wherein the feedback is used for linear precoding.

15. The wireless communications apparatus of claim 14, further comprising means for estimating a channel matrix associated with the forward link channel.

16. The wireless communications apparatus of claim 14, wherein the transmit covariance from the forward link channel is substantially similar to an estimate of a transmit covariance from a reverse link channel.

17. A non-transitory computer-readable medium having stored thereon computer-executable instructions which, when executed by a processor, cause the processor to generate feedback for linear precoding based upon a transmit covariance, the computer-executable instructions being executed at a communications apparatus, the executable instructions comprising instructions for:
estimating the transmit covariance from a forward link channel;
estimating a matrix related to the forward link channel;
modifying a predefined codebook that includes a plurality of matrices based upon the transmit covariance, wherein a disparate communications apparatus maintains a codebook that is substantially similar to the predefined codebook, wherein modifications made to the disparate communications apparatus' codebook are substantially similar to modifications made to the predefined codebook by the communications apparatus, and wherein at least one matrix of the plurality of matrices has a dimension that is a rank of the forward link channel, wherein the modifying comprises determining a product of a square root of a transmit covariance matrix and an original matrix from the predefined codebook;
identifying a particular one of the plurality of matrices as a function of the estimated matrix; and
transmitting feedback related to the particular one of the plurality of matrices over a reverse link channel, wherein the feedback is used for linear precoding.

18. The non-transitory computer-readable medium of claim 17, wherein the computer-executable instructions further comprise instructions for determining a channel related unitary matrix from the estimated matrix related to the forward link channel.

19. In a wireless communication system, an apparatus that generates feedback for linear precoding based upon a transmit covariance, the method being performed by a communications apparatus, the method comprising:
a processor configured to:
determine the transmit covariance pertaining to a forward link channel;
adjust precoding matrices included in a predefined codebook based upon the transmit covariance, wherein a disparate communications apparatus maintains a codebook that is substantially similar to the predefined codebook, wherein adjustments made to precoding matrices in the disparate communications apparatus' codebook are substantially similar to adjustments made to precoding matrices in the predefined codebook by the communications apparatus, and wherein the predefined codebook comprises at least one matrix having a dimension that is a rank of the forward link channel, wherein the adjusting comprises determining a product of a square root of a transmit covariance matrix and an original matrix from the predefined codebook; and
yield precoding feedback based upon the adjusted precoding matrices, wherein the feedback is used for linear precoding.

20. A method for controlling forward link transmission based upon linear precoding that utilizes a measure of a transmit covariance, the method being performed by a communications apparatus, the method comprising:
determining the transmit covariance from an analysis of a reverse link channel;
altering a predefined codebook based upon the transmit covariance, wherein a disparate communications apparatus maintains a codebook that is substantially similar to the predefined codebook, wherein alterations made to the disparate communications apparatus' codebook are substantially similar to alterations made to the predefined codebook by the communications apparatus, and wherein the predefined codebook comprises at least one matrix having a dimension that is a rank of a forward link channel, wherein the altering comprises determining a product of a square root of a transmit covariance matrix and an original matrix from the predefined codebook;
analyzing received feedback based upon the altered codebook; and
controlling transmission over the forward link channel by applying the analyzed feedback, wherein the feedback is used for linear precoding.

21. The method of claim 20, further comprising effectuating beamforming based upon the analyzed feedback.

22. The method of claim 20, wherein the reverse link channel and the forward link channel are associated with a multiple-input multiple-output environment.

23. The method of claim 20, wherein the reverse link channel and the forward link channel utilize frequency division duplexing.

24. The method of claim 20, wherein the reverse link channel and the forward link channel employ time division duplexing.

25. The method of claim 20, wherein the transmit covariance determined from analysis of the reverse link channel is substantially similar to an estimation of a covariance from a forward link channel related to the received feedback.

26. The method of claim 20, further comprising analyzing received feedback obtained from a disparate communications apparatus that effectuated scalar quantization.

27. A wireless communications apparatus that controls forward link transmission by employing linear precoding with an estimation of a transmit covariance comprising:
a memory that retains a codebook and instructions for determining the transmit covariance, modifying a preset codebook based on the transmit covariance, wherein the preset codebook comprises at least one matrix having a dimension that is a rank of a forward link channel, and evaluating feedback based upon the modified codebook, wherein the feedback is used for linear precoding, wherein the modifying comprises determining a product of a square root of a transmit covariance matrix and an original matrix from the preset codebook; and
a processor, coupled to the memory, configured to execute the instructions retained in the memory;
wherein a disparate communications apparatus maintains a codebook that is substantially similar to the preset codebook, wherein modifications made to the disparate communications apparatus' codebook are substantially similar to modifications made to the preset codebook by the communications apparatus.

28. The wireless communications apparatus of claim 27, wherein the memory includes instructions for performing beamforming associated with forward link channel transmission, the beamforming being based upon the evaluated feedback.

29. A wireless communications apparatus that controls forward link transmission by employing linear precoding with an estimation of a transmit covariance, comprising:
means for identifying the transmit covariance based upon analysis of a reverse link channel;
means for adjusting a predefined codebook as a function of the transmit covariance, wherein a disparate communications apparatus maintains a codebook that is substantially similar to the predefined codebook, wherein adjustments made to the disparate communications apparatus' codebook are substantially similar to adjustments made to the predefined codebook by the communications apparatus, and wherein the predefined codebook comprises at least one matrix having a dimension that is a rank of a forward link channel, wherein the adjusting comprises determining a product of a square root of a transmit covariance matrix and an original matrix from the predefined codebook;

means for evaluating feedback by utilizing the adjusted codebook; and means for controlling forward link transmission based upon the evaluated feedback, wherein the feedback is used for linear precoding.

30. A non-transitory computer-readable medium having stored thereon computer-executable instructions which, when executed by a processor, cause the processor to perform the steps for controlling forward link transmission based upon linear precoding that utilizes a measure of a transmit covariance matrix, the computer-executable instructions being executed at a communications apparatus, the computer-executable instructions comprising instructions for:

estimating the transmit covariance matrix from an evaluation of a reverse link channel;

modifying original precoding matrices in a predefined codebook based upon the transmit covariance matrix, wherein a disparate communications apparatus maintains a codebook that is substantially similar to the predefined codebook, wherein modifications made to precoding matrices in the disparate communications apparatus' codebook are substantially similar to modifications made to precoding matrices in the predefined codebook by the communications apparatus, and wherein the predefined codebook comprises at least one matrix having a dimension that is a rank of a forward link channel, wherein the modifying comprises determining a product of a square root of a transmit covariance matrix and at least one of the original matrices from the predefined codebook; and controlling communications over a forward link channel based upon an evaluation of received feedback by employing the modified precoding matrices, wherein the feedback is used for linear precoding.

31. The non-transitory computer-readable medium of claim 30, wherein the computer-executable instructions further comprise instructions for identifying a particular modified precoding matrix associated with the received feedback.

32. In a wireless communication system, an apparatus that controls forward link transmission by employing linear precoding with an estimation of a transmit covariance comprising:

a processor configured to:

evaluate the transmit covariance associated with a reverse link channel;

alter a codebook at a communications apparatus based upon the transmit covariance, wherein a disparate communications apparatus maintains a codebook that is substantially similar to the codebook, wherein alterations made to the disparate communications apparatus' codebook are substantially similar to alterations made to the codebook by the communications apparatus, wherein the altering comprises determining a product of a square root of a transmit covariance matrix and an original matrix from the codebook;

receive feedback related to a forward link channel, wherein the codebook comprises at least one matrix having a dimension that is a rank of the forward link channel;

evaluate the feedback based upon the altered codebook, and control subsequent transmission over the forward link channel based upon the evaluation of the feedback, wherein the feedback is used for linear precoding.

* * * * *